US010377385B2

(12) United States Patent
Hanatsuka

(10) Patent No.: US 10,377,385 B2
(45) Date of Patent: Aug. 13, 2019

(54) ROAD SURFACE CONDITION DETERMINING SYSTEM

(71) Applicant: BRIDGESTONE CORPORATION, Tokyo (JP)

(72) Inventor: Yasushi Hanatsuka, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 109 days.

(21) Appl. No.: 15/516,970

(22) PCT Filed: Oct. 6, 2015

(86) PCT No.: PCT/JP2015/079398
§ 371 (c)(1),
(2) Date: Apr. 5, 2017

(87) PCT Pub. No.: WO2016/056569
PCT Pub. Date: Apr. 14, 2016

(65) Prior Publication Data
US 2017/0297580 A1 Oct. 19, 2017

(30) Foreign Application Priority Data

Oct. 6, 2014 (JP) .................................. 2014-206017

(51) Int. Cl.
*G01W 1/00* (2006.01)
*G01W 1/02* (2006.01)
(Continued)

(52) U.S. Cl.
CPC ............. *B60W 40/06* (2013.01); *B60C 19/00* (2013.01); *B60T 8/172* (2013.01); *G01W 1/00* (2013.01);
(Continued)

(58) Field of Classification Search
CPC ............... B60C 19/00; B60C 2019/004; B60T 2210/12; B60T 2210/36; B60T 8/172;
(Continued)

(56) References Cited

U.S. PATENT DOCUMENTS 6,853,894 B1 * 2/2005 Kolls .................. G01M 17/007
340/426.36
6,919,821 B1 7/2005 Smith
(Continued)

FOREIGN PATENT DOCUMENTS

CN 103003110 A 3/2013
CN 103717469 A 4/2014
(Continued)

OTHER PUBLICATIONS

International Preliminary Report on Patentability with translation of Written Opinion issued from the International Bureau in counterpart International Application No. PCT/JP2015/078398, dated Apr. 11, 2017.

(Continued)

*Primary Examiner* — Randy W Gibson
*Assistant Examiner* — Gedeon M Kidanu
(74) *Attorney, Agent, or Firm* — Sughrue Mion, PLLC

(57) ABSTRACT

The invention provides a road surface condition determining system with improved accuracy. In the system, a plurality of vehicles $W_i$ are used, each equipped with on-board sensors (11, 12) for acquiring vehicular information, which is information on the behavior of the vehicle during travel, a feature value calculating means (13) for calculating a plurality of feature values to be used in estimating the condition of the road surface on which the vehicle is traveling from the vehicular information acquired by the on-board sensors (11, 12), and a transmitter 16 for transmitting the feature values to the outside of the vehicle. A server (20) has a data storage
(Continued)

means (22) for accumulating the plurality of feature values from the plurality of vehicles. A road surface condition determining unit (30) determines a road surface condition using the accumulated feature values. And the system determines the road surface condition at the location within a predetermined range within a predetermined space of time.

6 Claims, 3 Drawing Sheets

(51) Int. Cl.
G07C 5/00 (2006.01)
G08G 1/01 (2006.01)
B60C 19/00 (2006.01)
B60T 8/172 (2006.01)
B60W 40/06 (2012.01)

(52) U.S. Cl.
CPC ........... *G07C 5/008* (2013.01); *G08G 1/0112* (2013.01); *G08G 1/0141* (2013.01); *B60C 2019/004* (2013.01); *B60T 2210/12* (2013.01); *B60T 2210/36* (2013.01); *B60W 2422/70* (2013.01); *G01W 1/02* (2013.01)

(58) Field of Classification Search
CPC .... B60W 2422/70; B60W 40/06; G01W 1/00; G01W 1/02; G07C 5/008; G08G 1/0141; G08G 1/0112
See application file for complete search history.

(56) References Cited

U.S. PATENT DOCUMENTS

| | | | | |
|---|---|---|---|---|
| 2001/0045891 | A1* | 11/2001 | Nakao | G08G 1/0104 340/426.1 |
| 2007/0139168 | A1 | 6/2007 | Rennie et al. | |
| 2009/0005929 | A1* | 1/2009 | Nakao | B60T 7/22 701/33.4 |
| 2009/0105921 | A1* | 4/2009 | Hanatsuka | B60G 17/0165 701/80 |
| 2009/0160675 | A1* | 6/2009 | Piccinini | G08G 1/0104 340/905 |
| 2009/0312943 | A1 | 12/2009 | Kelly et al. | |
| 2012/0330493 | A1* | 12/2012 | Hanatsuka | B60T 8/172 701/29.1 |
| 2013/0116972 | A1* | 5/2013 | Hanatsuka | B60T 8/172 702/167 |
| 2014/0081573 | A1 | 3/2014 | Urmson et al. | |
| 2014/0122014 | A1* | 5/2014 | Flik | G01B 21/30 702/141 |
| 2014/0163770 | A1* | 6/2014 | Wakao | B60W 40/068 701/1 |
| 2015/0210286 | A1* | 7/2015 | Hanatsuka | B60C 99/00 701/34.4 |
| 2016/0258118 | A1* | 9/2016 | Jinno | B60W 40/06 |

FOREIGN PATENT DOCUMENTS

| | | |
|---|---|---|
| DE | 102012219631 A1 | 4/2014 |
| JP | 8261993 A | 10/1996 |
| JP | 2002-008198 A | 1/2002 |
| JP | 2005059800 A | 3/2005 |
| JP | 2008-297872 A | 12/2008 |
| JP | 2011-242303 A | 12/2011 |
| JP | 2014035279 A | 2/2014 |
| WO | 2014025018 A1 | 2/2014 |

OTHER PUBLICATIONS

Communication dated Aug. 30, 2017, from European Patent Office in counterpart application No. 15848631.6.
Communication dated Nov. 16, 2018, from State Intellectual Property Office of the P.R.C. in counterpart application No. 201580066169X.
International Search Report for PCT/JP2015/078398, dated Jan. 12, 2016.

* cited by examiner

ROAD SURFACE CONDITION DETERMINING SYSTEM

CROSS REFERENCE TO RELATED APPLICATIONS

This is a National Stage of International Application No. PCT/JP2015/078398 filed Oct. 6, 2015, claiming priority based on Japanese Patent Application No. 2014-206017 filed Oct. 6, 2014, the contents of all of which are incorporated herein by reference in their entirety.

BACKGROUND OF THE INVENTION

1. Field of the Invention

The present invention relates to a system for determining a road surface condition under a traveling vehicle, and particularly to a system for determining a road surface condition using vehicular information from a plurality of vehicles traveling along the same location within a predetermined space of time.

2. Description of the Related Art

In order to raise the travel safety of a vehicle, it is desired to accurately estimate the condition of the road surface on which the vehicle is traveling and to have the information fed back to vehicle control. If the road surface condition can be estimated, the safety of vehicular driving can be enhanced markedly since it becomes possible to turn on an advanced control of ABS braking, for instance, before the driver initiates a danger-avoiding control, such as braking or steering.

As methods having been proposed for estimating the condition of a road surface under a traveling vehicle, there are methods for estimating the condition of a road surface under a traveling vehicle by detecting the vibration of the tire of the traveling vehicle and estimating the road surface condition from the time-series waveform of the detected tire vibration (see Patent Documents 1 to 3, for instance) and methods for estimating a road surface condition from detected sound pressure levels of tire noise by detecting tire noise arising from a tire (see Patent Document 4, for instance).

CONVENTIONAL ART DOCUMENT

Patent Document

Patent Document 1: Japanese Unexamined Patent Application Publication No. 2011-242303
Patent Document 2: Japanese Unexamined Patent Application Publication No. 2005-59800
Patent Document 3: Japanese Unexamined Patent Application Publication No. 2014-35279
Patent Document 4: Japanese Unexamined Patent Application Publication No. 8-261993

SUMMARY OF THE INVENTION

Problem to be Solved by the Invention

However, with the conventional methods, the accuracy in determining the road surface condition is not necessarily adequate because the road surface condition under a traveling vehicle is estimated from the information from a single vehicle.

The present invention has been made to solve the foregoing problems, and an object of the invention is to provide a road surface condition determining system capable of improving the accuracy in determining the road surface condition.

Means for Solving the Problem

A system for determining a road surface condition according to an embodiment of the present invention includes a plurality of vehicles, each vehicle having on-board sensors for acquiring vehicular information, which is information on the behavior of a vehicle during travel, a feature value calculating means for calculating a plurality of feature values for estimating the condition of the road surface on which the vehicle is traveling (hereinafter referred to as road surface condition) from the vehicular information acquired by the on-board sensors, and a transmitting means for transmitting the feature values to the outside of the vehicle; a server for accumulating the feature values transmitted from the transmitting means of each of the plurality of vehicles; and a road surface condition determining unit for determining the road surface condition using the accumulated feature values $X_{ij}$ (i=1 to n: n is the number of vehicles, j=1 to m: m is the number of feature values) of the plurality of vehicles. In this system, the transmitted feature values are the feature values at the location within the predetermined range within the predetermined space of time, and the road surface condition determining unit determines the road surface condition at the location within the predetermined range within the predetermined space of time, using the feature values of the plurality of vehicles.

BEST MODE FOR CARRYING OUT THE INVENTION

First Embodiment

Figure 1:
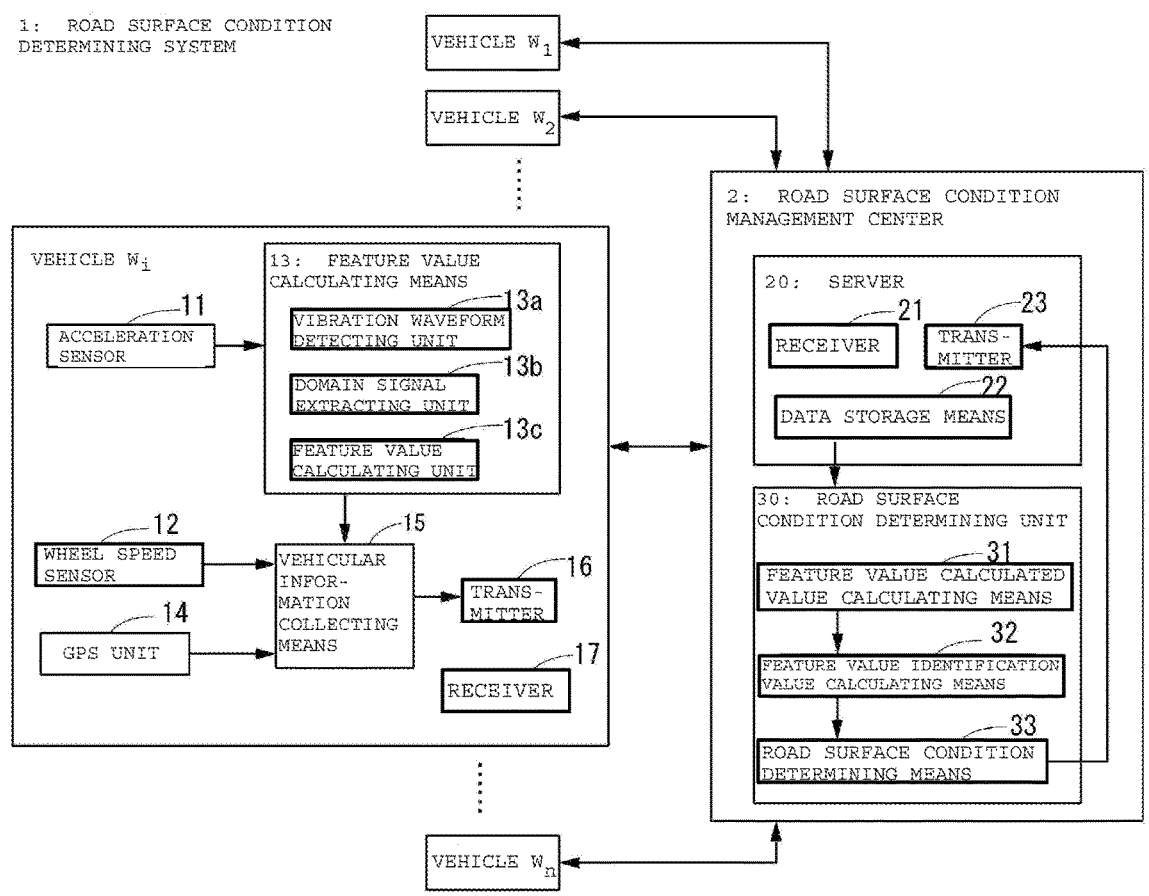
FIG. 1 is a diagram showing a constitution of a road surface condition determining system according to the first embodiment of the present invention.

FIG. 1 is a block diagram showing a constitution of a road surface condition determining system according to the first embodiment of the present invention. The reference numerals $W_1$ to $W_n$ are vehicles, and each of the vehicles $W_i$ (i=1 to n) includes an acceleration sensor 11, a wheel speed sensor 12, a feature value calculating means 13, a GPS unit 14, a vehicular information collecting means 15, a transmitter 16, and a receiver 17.

It is to be noted that the vehicles $W_i$ to $W_n$ are the vehicles that pass a location within a predetermined range within a predetermined space of time.

A server 20 includes a receiver 21, a data storage means 22, and a transmitter 23. A road surface condition determining unit 30 includes determines the condition of the road surface at the location within the predetermined range within the predetermined space of time.

The server 20 and the road surface condition determining unit 30 are provided in a road surface condition management center 2.

The feature value calculating means 13 and the road surface condition determining unit 30 are constituted by computer software, for instance.

Figure 2:
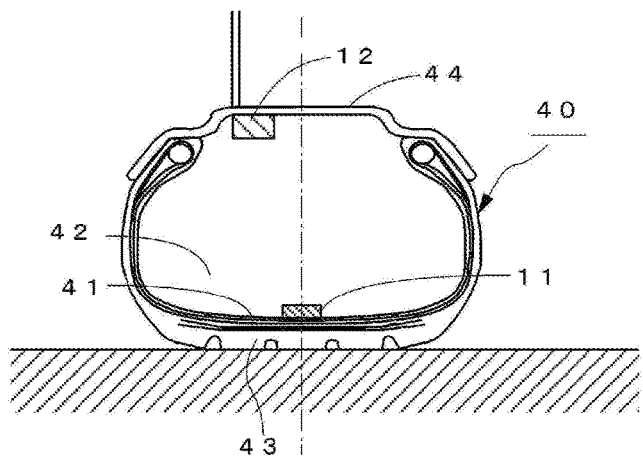
FIG. 2 is an illustration showing a disposition example of an acceleration sensor.

The acceleration sensor 11, as shown in FIG. 2, is disposed approximately in the middle portion on the tire air chamber 42 side of the inner liner 41 of the tire 40 and detects the vibration (tire vibration) inputted to the tread 43 of the tire 40 from the road surface.

The wheel speed sensor 12 detects the revolution speed of wheels (wheel speed). A wheel speed sensor of an electromagnetic induction type known in the art, which detects the angle of rotation of a wheel, for example, may be used as the wheel speed sensor 12.

The feature value calculating means 13 includes a vibration waveform detecting unit 13a, a domain signal extracting unit 13b, and a feature value calculating unit 13c. And the feature value calculating means 13 calculates the feature values for estimating the condition of the road surface on which the vehicles $W_i$ are traveling (road surface condition) from the time-series waveforms of tire vibration detected by the acceleration sensor 11.

Figure 3:
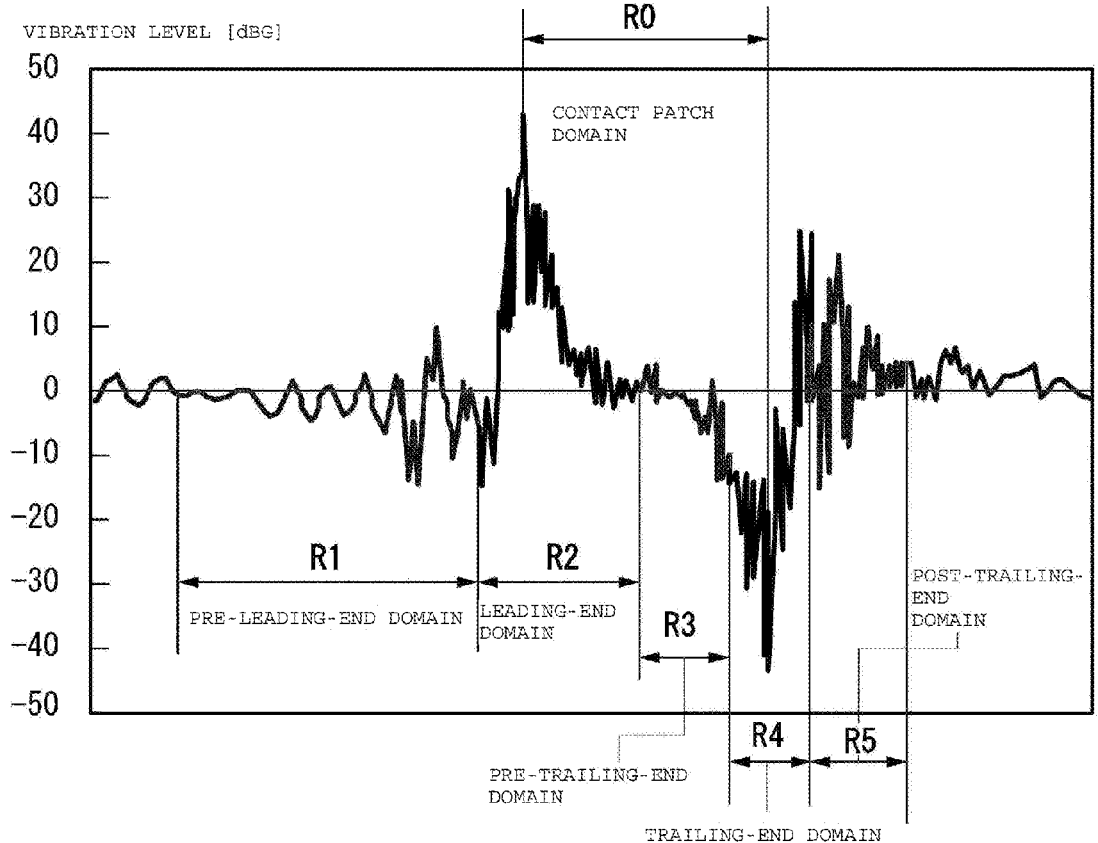
FIG. 3 is a diagram showing how to calculate feature values.

The vibration waveform detecting unit 13a, as shown in FIG. 3, detects acceleration waveforms for one revolution of a tire, using the wheel speed detected by the wheel speed sensor 12.

The domain signal extracting unit 13b divides the acceleration waveforms for one revolution of a tire into the pre-leading-end domain R1, which precedes the leading-side peak appearing at the leading end, the leading-end domain R2, which constitutes the leading-side peak, the pre-trailing-end domain R3, which is between the leading-side peak and the trailing-side peak appearing at the trailing end, the trailing-end domain R4, which constitutes the trailing-side peak, and the post-trailing-end domain R5, which comes after the trailing-side peak, and extracts the time-series waveforms of vibration levels in the respective domains R1 to R5.

The feature value calculating unit 13c passes the respective time-series waveforms of the domains R1 to R5 through a band-pass filter, calculates m units of band values, which are the magnitudes of vibration components within the predetermined domains and in the predetermined frequency ranges, and transmits these band values as the feature values $X_{ij}$ (j=1 to m) of the vehicles $W_i$ (i=1 to n) from the transmitter 16 to the road surface condition management center 2. It is to be noted that the band values from the respective domains R1 to R5 may be a plurality of band values, or may include domains where the feature values $X_{ij}$ are not calculated. Also, the acceleration waveforms for one revolution of a tire may be divided into three domains of pre-leading-end domain, contact patch domain, and post-trailing-end domain, for instance.

In other words, m-dimensional feature vectors $X_i$ whose components are $(X_{i1}, X_{i2}, \ldots, X_{im})$ are transmitted from the vehicles $W_i$ (i=1 to n) to the road surface condition management center 2.

It is to be noted that the feature values $X_{ij}$ of the vehicles $W_i$ which can be cited may include the vibration levels of a plurality of frequency bands changing with road surface conditions obtained from the frequency spectrums of time-series waveforms of acceleration detected by an acceleration sensor provided inside the tire or on the wheel or knuckle, the band values of variation spectrums of air pressure detected by a pressure sensor provided in the tire air chamber, and the band power values of tire noise captured by a microphone provided inside the tire or on the frame anterior to the rear wheel.

Or the arrangement may be such that a bidirectional vibration sensor provided as an on-board sensor detects the tire-circumferential vibrations and tire-radial vibrations and the specific frequency components of these vibration waveforms are used as the feature values $X_{ij}$ of the vehicles $W_i$. In this case, the feature values $X_i$ have two components.

Moreover, the feature values that can be used include the tread shear stress detected by a detector provided in a tread block, the circumferential tire interior distortion detected by a distortion sensor provided inside the tire, and the time-series data on wheel speed detected by a wheel speed sensor.

The GPS unit 14, equipped with not-shown GPS antenna and receiver, obtains the position data of the vehicles $W_i$.

The vehicular information collecting means 15 collects the feature values $X_{ij}$ of the vehicles $W_i$ calculated by the feature value calculating means 13, the position data of the vehicles obtained by the GPS unit 14, and the data on the time of acquisition of vehicular information (time data). Note that the time data that may be used include the extraction times of time-series waveforms of acceleration, acquisition times of position data, and data transmission times. These times, which are almost simultaneous, pose no problem as time data.

The transmitter 16 transmits the data of the m units of feature values $X_{ij}$ collected by the vehicular information collecting means 15, the position data of the vehicles, and the time data, together with the vehicle IDs for identifying the vehicles, from a not-shown transmission antenna to the server 20 of the road surface condition management center 2.

The receiver 17 receives the data on the road surface condition at the location within the predetermined range within the predetermined space of time determined by the road surface condition determining unit 30 in the road surface condition management center 2 and transmitted from the transmitter 23 of the server 20. It should be appreciated that by having the received data on the road surface condition displayed on a monitor installed within the vehicle, the driver can be informed of the road surface condition at the location within the predetermined range within the predetermined space of time.

Also, by feeding back the data on the road surface condition to vehicle control, the travel safety of the vehicle can be improved.

The server 20 receives the vehicular information sent from the respective vehicles $W_i$ (i=1 to n) by its receiver 21, stores these data in the data storage means 22, and transmits the data on the road surface condition at the location within the predetermined range within the predetermined space of time determined by the road surface condition determining unit 30 to the registered vehicles from its transmitter 23.

The data of the feature values $X_{ij}$ of the respective vehicles $W_i$ are classified and stored in the data storage means 22.

Here, the "predetermined time" as used herein refers to 1 to 5 minutes, including the determination time set in advance. The "predetermined range" as used herein refers to a range of a location set in advance on a road map, for instance. Also, designation of a predetermined range may be made using a grid of appropriate size on a navigation road map, for instance. The arrangement like this is preferable because it will ensure consistency of the vehicle positions of vehicles $W_i$ in relation to the server 20.

Also, note that the "registered vehicles" include not only the vehicles $W_i$ that send the feature values $X_{ij}$ but also any vehicle in communication with the server 20.

The road surface condition determining unit 30 includes a feature value calculated value calculating means 31, a feature value identification value calculating means 32, and a road surface condition determining means 33. And the road surface condition determining unit 30 determines a road surface condition at the location within the predetermined range within the predetermined space of time, using the data of the feature values $X_{ij}$ sent from the respective vehicles $W_i$. It is to be noted that, in the present example, the road surface conditions R are classified into DRY road surface, WET road surface, SNOW road surface, and ICE road surface.

The feature value calculated value calculating means 31 calculates the calculated values $X_j$ of the feature values $X_{ij}$ of the vehicles $W_i$ at the location within the predetermined range within the predetermined space of time.

The calculated values $X_j$ that can be used may be, for example, $X_j=(X_{1j}+X_{2j}+\ldots+X_{nj})/n$, namely, the mean values of the calculated values $X_j$. The number of calculated values $X_j$ is m, which is the same as the number of feature values $X_{ij}$. It is to be noted that the calculated values may be the median values instead of the mean values.

The feature value identification value calculating means 32 inputs the calculated values $X_j$ to the road surface identification (discriminant) functions $F_R$ (R: road surface conditions), respectively, and calculates the feature value identification values $Y_R$, which are the identification values of the respective feature values $X_j$. The road surface identification functions $Y_R(X)$, which distinguish road surface conditions R from the other road surface conditions R', are generated for the respective road surface conditions.

In the present example, the road surface identification functions $F_R(X)$ are expressed as $Y_R=F_R(X)=a_R \cdot X+b_R$.

The coefficient $a_R$ is a vector having m units of components as with the calculated values $X_j$, and $b_R$ is a constant. Here, if $a_R=(a_{R1}, a_{R2}, \ldots, a_{Rm})$, then the respective components of the vector $a_{RK}$ (k=1 to m) are the "weights" for the feature values $X_K$ and take different values for the respective road surface conditions R. $a_{RK}$ are determined in advance with the test vehicle operated on each of the DRY, WET, SNOW, and ICE road surfaces.

The feature value identification value $Y_D$ of the DRY road surface is expressed by the following equation (1):

$$Y_D=a_{D1} \cdot X_1+a_{D2} \cdot X_2+\ldots+a_{Dm} \cdot X_m+b_D \quad (1)$$

In a similar manner, the feature value identification value $Y_W$ of the WET road surface, the feature value identification value $Y_S$ of the SNOW road surface, and the feature value identification value $Y_I$ of the ICE road surface can be expressed by the following equations (2) to (4), respectively:

$$Y_W=a_{W1} \cdot X_1+a_{W2} \cdot X_2+\ldots+a_{Wm} \cdot X_m+b_W \quad (2)$$

$$Y_S=a_{S1} \cdot X_1+a_{S2} \cdot X_2+\ldots+a_{Sm} \cdot X_m+b_S \quad (3)$$

$$Y_I=a_{I1} \cdot X_1+a_{I2} \cdot X_2+\ldots+a_{Im} \cdot X_m+b_I \quad (4)$$

The road surface condition determining means 33 determines the road surface condition corresponding to the feature value identification value $Y_R$ taking the largest value to be the road surface condition at the location within the predetermined range within the predetermined space of time.

This determination of the road surface condition may be performed at every predetermined time for every region including a plurality of predetermined locations. Then the road surface conditions on the road map at every predetermined time can be estimated with excellent accuracy.

It is to be noted that, as the road surface identification functions $Y_R(X)$ known identification techniques, such as kernel method, SVM method, lest-square method, and neural net method, may be used.

As described above, in the first embodiment of the invention, the calculated values $X_j$ of the feature values $X_{ij}$ of the vehicles $W_i$ at the location within a predetermined range within a predetermined space of time are calculated, respectively. And the feature value identification values $Y_D$, $Y_W$, $Y_S$, $Y_I$, for the respective road surface conditions R are calculated by inputting the calculated values $X_j$ to the road surface identification functions $Y_R(X)$ set in advance for the respective road surface conditions. Then the road surface condition R corresponding to the feature value identification value $Y_R$ taking the largest value is determined as the location within the predetermined range within the predetermined space of time. Hence, it is possible to determine the road surface condition with excellent accuracy.

Second Embodiment

Figure 4:
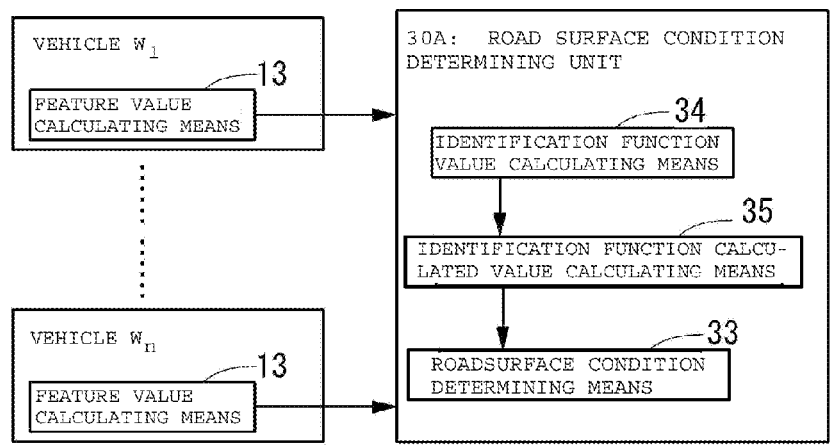
FIG. 4 is a diagram showing a constitution of a road surface condition determining unit according to the second embodiment of the present invention.

In the foregoing first embodiment, a road surface condition R is determined using the feature value identification values $Y_D$, $Y_W$, $Y_S$, $Y_I$ obtained by inputting the calculated values $X_j$ of the feature values $X_{ij}$ of the vehicles $W_i$ to the respective road surface identification functions $Y_R(X)$ set in advance for the respective road surface conditions. However, a road surface condition determining unit 30A having a constitution as shown in FIG. 4 may be provided in the place of the road surface condition determining unit 30. Then the feature value identification values $Y_R(X_{ij})$ of the respective vehicles $W_i$ may be obtained, and the road surface condition R may be determined using these feature value identification values $Y_R(X_{ij})$.

The road surface condition determining unit 30A includes an identification function value calculating means 34, an identification function calculated value calculating means 35, and a road surface condition determining means 33.

The identification function value calculating means 34 calculates the identification function values $Y_{iR}=F_R(X_{ij})$ of the feature values $X_{ij}$ of the vehicles $W_i$ at the location within the predetermined range within the predetermined space of time, using the road surface identification functions $F_R(X)=a_R \cdot X+b_R$ set for the respective road surface conditions in the same manner as in the first embodiment.

The feature value identification values $Y_{iD}$ of the vehicles Wi on the DRY road surface can be expressed by the following equation (5):

$$Y_{iD}=a_{D1} \cdot X_{i1}+a_{D2} \cdot X_{i2}+\ldots+a_{Dm} \cdot X_{im}+b_D \quad (5)$$

In a similar manner, the feature value identification values $Y_{iW}$ on the WET road surface, the feature value identification values $Y_{iS}$ on the SNOW road surface, and the feature value identification values $Y_{iI}$ on the ICE road surface can be expressed by the following equations (6) to (8), respectively:

$$Y_{iW}=a_{W1} \cdot X_{i1}+a_{W2} \cdot X_{i2}+\ldots+a_{Wm} \cdot X_{im}+b_W \quad (6)$$

$$Y_{iS}=a_{S1} \cdot X_{i1}+a_{S2} \cdot X_{i2}+\ldots+a_{Sm} \cdot X_{im}+b_S \quad (7)$$

$$Y_{iI}=a_{I1} \cdot X_{i1}+a_{I2} \cdot X_{i2}+\ldots+a_{Im} \cdot X_{im}+b_I \quad (8)$$

The identification function calculated value calculating means 35 calculates the identification function calculated values $Z_R$, which are the calculated values based on the identification function values $Y_{iR}$ (i=1 to n, R: DRY, WET, SNOW, ICE) of n units of vehicles $W_i$ calculated by the identification function value calculating means 34.

As the identification function calculated values $Z_R$, $Z_R = Y_{1R} + Y_{2R} + \ldots + Y_{nR})/n$, namely, the mean values of the identification function values $Y_{iR}$ of the respective vehicles $W_i$, can be used, for instance.

It is to be noted that median values instead of mean values may be used as the identification function calculated values $Z_R$.

The road surface condition determining means 33 determines the road surface condition R corresponding to the identification function calculated value $Z_R$ taking the largest value to be the road surface condition within the predetermined range within the predetermined space of time.

By performing this determination of a road surface condition at every predetermined time for every region including a plurality of predetermined locations, it is possible to determine the road surface conditions at the respective times on the road map with excellent accuracy.

Third Embodiment

In the foregoing second embodiment, the identification function values $Y_{iR}$ of the feature values $X_{ij}$ of n units of vehicles $W_i$ are obtained, respectively, then the identification function calculated values $Z_R$, which are the calculated values based on the identification function values $Y_{iR}$, are calculated, and the road surface condition is determined using the identification function calculated values $Z_R$. However, the degrees of similarity $H_R$ of identification values, which are the degrees of similarity between the distribution state of the identification function values of the identification function values $Y_{iR}$ and the distribution state of the identification function values $C_R$ determined in advance for the respective road surface conditions, may be calculated, and the road surface condition at the location within the predetermined range within the predetermined space of time may be determined from the degrees of similarity $H_R$ of identification values. This can further improve the accuracy in determining the road surface condition.

Figure 5:
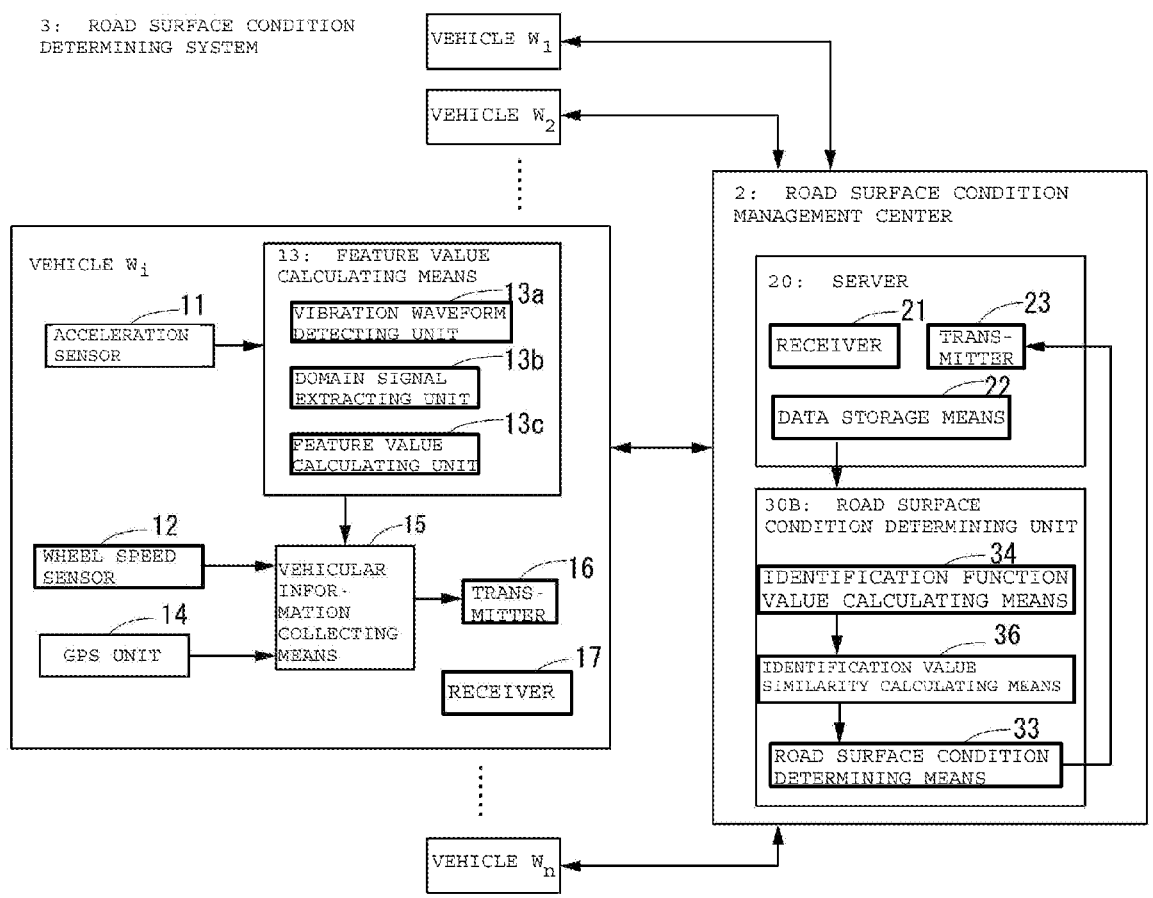
FIG. 5 is a diagram showing a constitution of a road surface condition determining system according to the third embodiment of the present invention.

FIG. 5 is a functional block diagram showing a constitution of a road surface condition determining system 3 according to the third embodiment of the present invention. The road surface condition determining system 3 includes n units of vehicles $W_i$ (i=1 to n), each equipped with an acceleration sensor 11, a wheel speed sensor 12, a feature value calculating means 13, a GPS unit 14, a vehicular information collecting means 15, a transmitter 16, and a receiver 17, and a server 20 and a road surface condition determining unit 30B both provided in the road surface condition management center 2.

Hereinbelow, a description is given of the road surface condition determining unit 30B. The description of the constitution and operation of the vehicles $W_i$ and the server 20 is omitted because they are the same as in the first embodiment.

The road surface condition determining unit 30B includes an identification function value calculating means 34, an identification value similarity calculating means 36, and a road surface condition determining means 33.

In the present example, the identification function value calculating means 34 of the second embodiment is used as the identification function value calculating means 34, and the identification function values $Y_{iR} = F_R(X_{ij})$ of the feature values $X_{ij}$ of the vehicles $W_i$ at the location within the predetermined range within the predetermined space of time are calculated.

The feature value identification values $Y_{iR}$ for the road surfaces R of the vehicles $W_i$ can be calculated by the following formula:

$$Y_{iR} = a_{R1} \cdot X_{i1} + a_{R2} \cdot X_{i2} + \ldots + a_{Rm} \cdot X_{im} + b_R$$

The identification value similarity calculating means 36 calculates the degrees of similarity $H_R$ of identification values between the distribution state of the identification function values $Y_{iR}$ (i=1 to n, R: DRY, WET, SNOW, ICE) of n units of vehicles $W_i$ calculated by the identification function value calculating means 34 and the distribution of the identification functions determined in advance for the respective road surface conditions R (hereinafter referred to as identified road surface models $M_R$).

The identified road surface models $M_R$ represent the distribution states of "4 (number of road surface conditions)×N units of identification function values $Y_{iR} = F_R(X_{Rj})$", which are derived by substituting "4 (number of road surface conditions)×N units of feature values $X_{Rj}$ (j=1 to m) obtained by operating a test vehicle fitted with standard tires several times (N times) at a constant speed on the R road surfaces into the respective road surface identification functions $F_R$.

The degrees of similarity between the distribution state of the feature value identification values $Y_{iR}$ calculated by the identification function value calculating means 34 and the identified road surface models $M_R$ can be calculated by use of a statistical model, such as mixture gaussian model, for instance.

The mixture gaussian model $G_R(x)$ is generated for each of the road surface conditions (four here), and can be expressed by the following formula [Equation 1]. That is, the formula of [Equation 1] is the formula of the identified road surface model $M_R$ using the mixture gaussian model.

[Equation 1]

$$G_R(X) = \sum_{k=1}^{K} \pi_k \frac{1}{(2\pi)^{d/2}} \frac{1}{|\Sigma_k|^{1/2}} \exp\left\{-\frac{1}{2}(x - \mu_k)^T \sum_k x - \mu_k\right\}$$

where K is the number of mixings and d is the number of road surface conditions R (d=4 here).

Also, the parameters, namely, the mixing ratio $\pi_R$, the covariance matrix $\Sigma_R$ of mixed elements, and the mean vector $\mu_R$ of mixed elements, can be obtained by use of known techniques, such as EM algorithm.

The degrees of similarity $H_R$ of identification values can be obtained by adding the degrees of similarity $h_{iR}$ of the respective vehicles, which are the values resulting from substitution by the identification function values $Y_i$ of the respective vehicles $W_i$, in the variable x in the above formula [Equation 1].

The identification function values $Y_i$ are vectors, and $Y_i = (Y_{iD}, Y_{iW}, Y_{iS}, Y_{iI})$.

In other words, the degree of similarity $H_D$ of DRY road surface is calculated by $H_D = \Sigma_i G_D(Y_i)$, and the degree of similarity $H_W$ of WET road surface by $H_W = \Sigma_i G_W(Y_i)$. Also, the degree of similarity $H_S$ of SNOW road surface is calculated by $H_S = \Sigma_i G_S(Y_i)$, and the degree of similarity $H_I$ of ICE road surface by $H_I = \Sigma_i G_I(Y_i)$ (i=1 to n).

The degrees of similarity $h_{iR}$ of the respective vehicles are the values corresponding to the distances between the identified road surface models $M_R$ and the identification function value vectors $Y_i$ of the respective vehicles $W_i$, and the degrees of similarity $H_R$ of identification values are the sums of those values.

The road surface condition determining means 33 determines the road surface condition R corresponding to the degree of similarity $H_R$ of identification values taking the largest value to be the road surface condition at the location within the predetermined range within the predetermined space of time.

In this manner, the road surface condition R is determined by checking to find which of the road surface models $M_R$, constituting the mixture gaussian models $G_R(x)$ the distribution state of the identification function value vector $Y_i$ is the most similar to. Therefore, it is possible to determine the road surface condition R at the location within the predetermined range within the predetermined space of time with even greater accuracy.

Fourth Embodiment

Figure 6:
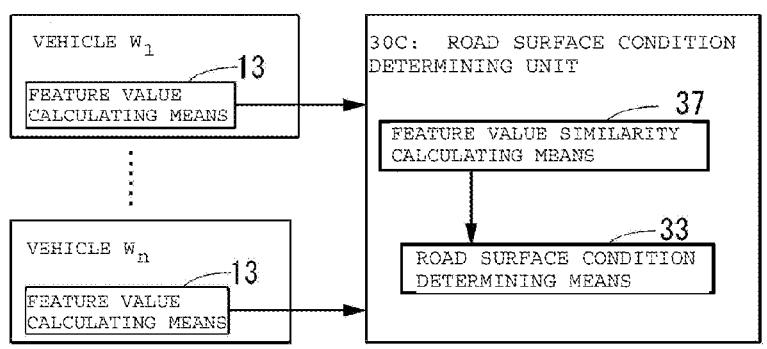
FIG. 6 is a diagram showing a constitution of a road surface condition determining unit according to the fourth embodiment of the present invention.

In the foregoing third embodiment, the road surface condition R is determined from the distribution state of the identification function values $Y_i$ of the respective vehicles $W_i$ and the distribution state of the identified road surface models $M_R$. However, a road surface condition determining unit 30C as shown in FIG. 6 may be provided in the place of the road surface condition determining unit 30B, and the road surface condition R may be determined from the distribution state of the feature value vectors $P_i$ constituting the feature values $X_{ij}$ of the respective vehicles $W_i$ and the distribution state of the feature value road surface models $C_R$ representing the distribution of the feature value vectors of the respective road surfaces.

The road surface condition determining unit 30C includes a feature value similarity calculating means 37 and a road surface condition determining means 33.

The feature value similarity calculating means 37 calculates the degrees of similarity $S_R$ between the distribution state of the feature value vectors $P_i=(X_{i1}, X_{i2}, \ldots, X_{im})$ of the respective vehicles $W_i$ constituting the feature values $X_{ij}$ (i=1 to n, j=1 to m) calculated by the feature value calculating means 13 and the distribution state of the feature values determined in advance for the respective road surface conditions R (hereinafter referred to as feature value road surface models $C_R$).

The feature value road surface models $C_R$ represent the distribution states of "4 (number of road surface conditions)×N units of feature value vectors $P_i$" obtained by operating a test vehicle fitted with standard tires several times (N times) at a constant speed on the R road surfaces.

The degrees of similarity between the distribution state of the feature value vectors $P_i$ and the feature value road surface models $C_R$ can be calculated by use of a statistical model, such as mixture gaussian model, as expressed by the formula [Equation 1] in the third embodiment.

The degrees of similarity $S_R$ are the values obtained by substituting the feature value vectors $P_i$ of the respective vehicles $W_i$ in the variable x in the above formula [Equation 1].

In other words, the degree of similarity $S_D$ of DRY road surface is calculated by $S_D=\Sigma_i G_D(P_i)$, and the degree of similarity $S_W$ of WET road surface by $S_W=\Sigma_i G_W(P_i)$. Also, the degree of similarity $S_S$ of SNOW road surface is calculated by $S_S=\Sigma_i G_S(P_i)$ and the degree of similarity $S_I$ of ICE road surface by $S_I=\Sigma_i G_I(P_i)$ (i=1 to n).

The degrees of similarity $S_R$ are also higher when the distances between the feature value road surface models $C_R$ and the feature values $X_{ij}$ of the respective vehicles $W_i$ are closer in the feature space.

The road surface condition determining means 33 determines the road surface condition R corresponding to the degree of similarity $S_R$ taking the largest value to be the road surface condition at the location within the predetermined range within the predetermined space of time.

In this manner, the road surface condition R can be determined by checking to find which of the road surface models among the feature value road surface models $M_X$, constituting the mixture gaussian models $G_R(x)$, the feature value vector $P_i$ is the most similar to. Then it is possible to determine the road surface condition R at the location within the predetermined range within the predetermined space of time with even greater accuracy.

Thus far, the invention has been described with reference to specific embodiments thereof. However, the technical scope of the invention is not limited to the described scope of the embodiments. And it should be evident to those skilled in the art that various modifications, changes, and improvements may be made thereto without departing from the spirit and scope of the invention. Accordingly, all such modifications and improvements are intended to be included within the technical scope of this invention as defined in the claims.

For example, the foregoing first to fourth embodiments are not limited to the classification of the road surface conditions into the four types of DRY road surface, WET road surface, SNOW road surface, and ICE road surface. The classification may be done by the road surface friction coefficient μ into "high-μ road (μ≥0.7)", "intermediate-μ road (0.3<μ<0.7)", "low-μ road (μ≤0.3)", for instance.

Also, in the foregoing first to fourth embodiments, the road surface condition is determined from the vehicular information collected by the respective vehicles $W_i$. However, each of the vehicles $W_i$ may be provided with a Web information acquiring means for acquiring extra-vehicular information by connecting to the not-shown Internet. Thus, weather information, such as weather, temperature, rainfall, wind speed, and sunshine hours, and road information, such as geography information, traffic information, and road management information, may be acquired. And by using the acquired extra-vehicular information, the road surface identification functions $F_R(X)$ or the identified road surface models $M_R$ or the feature value road surface models $C_R$ may be corrected. Or the road surface identification function $F_R(X)$ the identified road surface models $M_R$, or the feature value road surface models $C_R$ may be set or generated for each item of the extra-vehicular information. Then it is possible to further improve the accuracy in determining the road surface condition.

It is to be noted that a Web information acquiring means may be provided in the server 20 and the weather information and road information may be acquired by the server 20.

A road surface condition determining system according to one embodiment of the present invention includes a plurality of vehicles, each of the vehicles having on-board sensors for acquiring vehicular information, which is information on the behavior of vehicles during travel, a feature value calculating means for calculating a plurality of feature values for estimating the condition of the road surface on which the vehicles are traveling (hereinafter referred to as road surface condition) from the vehicular information acquired by the on-board sensors, and a transmitting means for transmitting the feature values to the outside of the vehicle. The system also includes a server for accumulating the feature values transmitted from the transmitting means of each of the plurality of vehicles and a road surface condition determining unit for determining the road surface condition using the accumulated feature values $X_{ij}$ (i=1 to n: n is the number of vehicles, j=1 to m: m is the number of feature values) of the plurality of vehicles. In this system, the transmitted feature values are the feature values at a location within a predetermined range within a predetermined space of time, and the road surface condition determining unit determines the road surface condition at the location within the predetermined range within the predetermined space of time, using the feature values of the plurality of vehicles.

In this manner, the road surface condition is determined using a plurality of feature values acquired from the vehicular information of the plurality of vehicles. Thus it is possible to improve the accuracy in determining the road surface condition.

Here, the term "feature values" refers to physical quantities used in estimating the road surface condition, such as the magnitudes of vibration (band values) in a plurality of specific frequency bands of time-series waveforms of acceleration detected by an acceleration sensor provided inside the tire or on the wheel or knuckle, the band values of air pressure variation signals detected by a pressure sensor provided within the tire air chamber, and the band values of sound pressure signals captured by a microphone provided inside the tire or on the frame anterior to the rear wheel.

Also, the "predetermined space of time" can be changed, that is, set longer of shorter depending on the section where the vehicles are traveling or the times at which the vehicles are traveling.

Also, the "predetermined space of time" may be set to be the space of time when the predetermined number (e.g., 5) of vehicles pass through the location within the predetermined range. In this case, too, the predetermined number of vehicles can be changed depending on the section where the vehicles are traveling or the times at which they are traveling.

Also, an on-board sensor used is an acceleration sensor disposed within a tire. Therefore, the differences in tire vibration resulting from road surface conditions can be grasped accurately, thereby further improving the accuracy in determining the road surface condition.

Also, a road surface condition determining system according to another embodiment of the present invention includes a road surface condition determining unit which has a feature value calculated value calculating means for calculating feature value calculated values $X_j$, which are the calculated values based on feature values $X_{ij}$ (i=1 to n, n is the number of vehicles, j is numbers given to specific feature values) from the plurality of vehicles at the location within the predetermined range within the predetermined space of time, for the plurality of feature values, respectively, a feature value identification value calculating means for calculating feature value identification values $Y_R$ to be obtained by inputting the plurality of feature value calculated values $X_j$ (j=1 to m, m is the number of feature values) to the respective road surface identification functions $Y_R=F_R$ (X) set in advance for the respective road surface conditions, for the respective road surface identification functions, and a road surface condition determining means for determining the road surface condition R at the location within the predetermined range within the predetermined space of time, using the feature value identification values $Y_R$ calculated for the respective road surface identification functions.

In this manner, the values obtained by substituting the feature value calculated values $X_j$ based on the feature values of a plurality of vehicles to the identification functions $Y_R=F_R(X)$ set for the respective road surface conditions are used as the identification values in determining the road surface condition R. Thus all the data of the feature values $X_{ij}$ of the plurality of vehicles are used in the determination of the road surface condition. Accordingly, it is possible to improve the accuracy in determining the road surface condition.

Also, a road surface condition determining system according to still another embodiment of the present invention includes a road surface condition determining unit which has an identification function value calculating means for calculating identification function values $Y_{iR}$, which are the identification values of the respective vehicles, for the respective road surface identification function values, by inputting the plurality of feature values $X_{ij}$ (i is the numbers given to the vehicles, j=1 to m, m is the number of feature values) to the road surface identification functions $Y_R=F_R$ (X) set in advance for the respective road surface conditions R, for the plurality of vehicles, respectively, an identification function calculated value calculating means for calculating identification function calculated values $Z_R$, which are the calculated values based on the identification function values $Y_{iR}$ calculated for the respective road surface identification functions, and a road surface condition determining means for determining the road surface condition at the location within the predetermined range within the predetermined space of time.

In this manner, the identification function values $Y_{iR}$ may be obtained for every vehicle, and identification function calculated values $Z_R$, which are the calculated values of these identification function values $Y_{iR}$, may be used as the identification values in determining the road surface condition R. This will improve the accuracy in determining the road surface condition.

Also, a road surface condition determining system according to still another embodiment of the present invention includes a road surface condition determining unit which has an identification function value calculating means for calculating identification function values $Y_{iR}$, which are the identification values of the respective vehicles, for the respective road surface identification functions, by inputting the plurality of feature values $X_{ij}$ to the road surface identification functions $Y_R=F_R(X)$ set in advance for the respective road surface conditions, for the plurality of vehicles, respectively, and a road surface condition determining means for determining the road surface condition at the location within the predetermined range within the predetermined space of time from the calculated degrees of similarity $H_R$ of identification values by calculating the degrees of similarity $H_R$ of identification values, which are the degrees of similarity between the distribution state of the identification function values $Y_{iR}$ for the respective calculated road surface identification functions and the distribution state of the identification function values determined in advance for the respective road surface conditions R (hereinafter referred to as "identified road surface models $M_R$").

In this manner, identified road surface models $M_R$ for the respective road surface conditions are generated in advance. And the reference in determining the road surface condition consists in, for instance, seeing whether the distribution state of the identification function values $Y_{iR}$ found from the actually measured feature values $X_{ij}$ is closer to the identified road surface model $M_D$ determined from the feature values obtained by operating a vehicle on the DRY road surface or to the identified road surface model $M_{R'}$ determined from the feature values obtained by operating the vehicle on the other road surface R'. As a result, it is possible to further improve the accuracy in determining the road surface condition.

Also, a road surface condition determining system according to still another embodiment of the present invention includes a road surface condition determining unit which has a feature value similarity calculating means for calculating the degrees of similarity $S_R$ of feature values, which are the degrees of similarity between the distribution state of the feature values $X_{ij}$ and the distribution state of the feature values determined in advance for the respective road surface conditions (hereinafter referred to as "feature value road surface models $C_R$"), and a road surface condition determining means for determining the road surface condition at the location within the predetermined range within the predetermined space of time from the calculated degrees of similarity $S_R$ of the feature values of the respective vehicles.

In this manner, feature value road surface models $C_R$ for the respective road surface conditions are generated in advance. And the reference in determining the road surface condition consists in, for instance, seeing whether the distribution state of the actually measured feature values $X_{ij}$ is closer to the feature value road surface model $C_D$ determined from the feature values obtained by operating a vehicle on the DRY road surface or to the feature value road surface models $C_{R'}$ determined from the feature values obtained by operating the vehicle on the other road surface R'. As a result, it is also possible to further improve the accuracy in determining the road surface condition.

Also, in a road surface condition determining system according to still another embodiment of the present invention, a means for acquiring extra-vehicular information is provided, and the road surface identification functions $F_R(X)$, the distribution state of identification function values for the respective road surface conditions (identified road surface models $M_R$), or the distribution state of the feature values for the respective road surface conditions (feature value road surface models $C_R$) are corrected using the acquired extra-vehicular information.

Here, the term "extra-vehicular information" refers to weather information, such as weather, temperature, rainfall, wind speed, and sunshine hours, or road information, such as geography information, traffic information, and road management information, acquired by connecting to the Internet, for instance.

Also, the information to be used in correction may include the estimation results of road surface conditions at other locations within a predetermined range. More specifically, among the past conditions (weather, traffic volume, estimation results of road surface conditions), the estimation results of road surface conditions at the location B within a predetermined range having a correlation to the location A within a predetermined range maybe used to correct the estimation result at the location A within a predetermined range.

Thus, it is possible to determine the road surface condition at the location within the predetermined range within the predetermined space of time with even greater accuracy.

It is to be understood that the foregoing summary of the invention does not necessarily recite all the features essential to the invention, and subcombinations of all these features are intended to be included in the invention.

INDUSTRIAL APPLICABILITY

As described herein, the present invention provides methods for determining a road surface condition within a predetermined space of time at a location within a predetermined range with excellent accuracy. Therefore, the travel safety of vehicles may be improved if the determination results are communicated to the vehicles traveling along the location within the predetermined range.

DESCRIPTION OF REFERENCE NUMERALS

1, 3 road surface condition determining system
2 road surface condition management center
11 acceleration sensor
12 wheel speed sensor
13 feature value calculating means
14 GPS unit
15 vehicular information collecting means
16 transmitter
17 receiver
20 server
21 receiver
22 data storage means
23 transmitter
30, 30A to 30C road surface condition determining unit
31 feature value calculated value calculating means
32 feature value identification value calculating means
33 road surface condition determining means
34 identification function value calculating means
35 identification function calculated value calculating means
36 identification value similarity calculating means
37 feature value similarity calculating means
40 tire
41 inner line
42 tire air chamber
43 tread
44 rim
$W_1$ to $W_n$ vehicle

The invention claimed is:

1. A system for determining a road surface condition comprising:
 a plurality of vehicles, each vehicle including
  on-board sensors for acquiring vehicular information, which is information on the behavior of a vehicle during travel,
  a feature value calculator that calculates a plurality of feature values for estimating the condition of the road surface on which the vehicle is traveling from the vehicular information acquired by the on-board sensors, and
  a transmitter that transmits the feature values to the outside of the vehicle; and
 a road surface condition management center including
  a server for accumulating the feature values transmitted from the transmitter of each of the plurality of vehicles; and
  a road surface condition determining unit for determining a road surface condition using the accumulated feature values of the plurality of vehicles;
 wherein the transmitted feature values are the feature values for a location within a predetermined range within a predetermined space of time, and
 wherein the road surface condition determining unit determines the road surface condition at the location within the predetermined range within the predetermined space of time, using the feature values of the plurality of vehicles;
 wherein the road surface condition determining unit comprises:
  a feature value calculated value calculator that calculates feature value calculated values, which are the calculated values based on feature values from the plurality of vehicles at the location within the predetermined range within the predetermined space of time, for the plurality of feature values, respectively;

a feature value identification value calculator that calculates feature value identification values to be obtained by inputting the plurality of feature value calculated values to the respective road surface identification functions set in advance for the respective road surface conditions, for the respective road surface identification functions;

a road surface condition determiner that determines the road surface condition at the location within the predetermined range within the predetermined space of time, using the feature value identification values calculated for the respective road surface identification functions, and a transmitter that transmits the determined road surface condition to the vehicle, wherein the determined road surface condition is displayed on a monitor within the vehicle to allow a driver to be informed of the determined road surface condition or is fed back to a vehicle control to safely control the vehicle.

2. The system for determining a road surface condition according to claim 1, wherein an on-board sensor is an acceleration sensor disposed within a tire.

3. The system for determining a road surface condition according to claim 1, further comprising an extra-vehicular information acquirer that acquires extra-vehicular information and the road surface identification functions, the distribution state of identification function values for the respective road surface conditions, or the distribution state of the feature values for the respective road surface conditions are corrected using the acquired extra-vehicular information.

4. A system for determining a road surface condition comprising:
   a plurality of vehicles, each vehicle including
      on-board sensors for acquiring vehicular information, which is information on the behavior of a vehicle during travel,
      a feature value calculator that calculates a plurality of feature values for estimating the condition of the road surface on which the vehicle is traveling from the vehicular information acquired by the on-board sensors, and
      a transmitter that transmits the feature values to the outside of the vehicle; and
   a road surface condition management center including
      a server for accumulating the feature values transmitted from the transmitter of each of the plurality of vehicles; and
      a road surface condition determining unit for determining a road surface condition using the accumulated feature values of the plurality of vehicles;
   wherein the transmitted feature values are the feature values for a location within a predetermined range within a predetermined space of time, and
   wherein the road surface condition determining unit determines the road surface condition at the location within the predetermined range within the predetermined space of time, using the feature values of the plurality of vehicles;
   wherein the road surface condition determining unit comprises:
      an identification function calculator that calculates identification function values, which are the identification values of the respective vehicles, for the respective identification function values, by inputting the plurality of feature values to the road surface identification functions set in advance for the respective road surface conditions, for the plurality of vehicles, respectively;
      an identification function calculated value calculator that calculates identification function calculated values, which are the calculated values based on the identification function values calculated for the respective road surface identification functions;
      a road surface condition determiner that determines the road surface condition at the location within the predetermined range within the predetermined space of time; and
   a transmitter that transmits the determined road surface condition to the vehicle, wherein the determined road surface condition is displayed on a monitor within the vehicle to allow a driver to be informed of the determined road surface condition or is fed back to a vehicle control to safely control the vehicle.

5. A system for determining a road surface condition comprising:
   a plurality of vehicles, each vehicle including
      on-board sensors for acquiring vehicular information, which is information on the behavior of a vehicle during travel,
      a feature value calculator that calculates a plurality of feature values for estimating the condition of the road surface on which the vehicle is traveling from the vehicular information acquired by the on-board sensors, and
      a transmitter that transmits the feature values to the outside of the vehicle; and
   a road surface condition management center including
      a server for accumulating the feature values transmitted from the transmitter of each of the plurality of vehicles; and
      a road surface condition determining unit for determining a road surface condition using the accumulated feature values of the plurality of vehicles;
   wherein the transmitted feature values are the feature values for a location within a predetermined range within a predetermined space of time, and
   wherein the road surface condition determining unit determines the road surface condition at the location within the predetermined range within the predetermined space of time, using the feature values of the plurality of vehicles;
   wherein the road surface condition determining unit comprises:
      an identification function value calculator that calculates identification function values, which are the identification values of the respective vehicles, for the respective road surface identification functions, by inputting the plurality of feature values to the road surface identification functions set in advance for the respective road surface conditions, for the plurality of vehicles, respectively;
      a road surface condition determiner that determines the road surface condition at the location within the predetermined range within the predetermined space of time from the calculated degrees of similarity of identification values by calculating the degrees of similarity of identification values, which are the degrees of similarity between the distribution state of the identification function values for the respective calculated road surface functions and the distribution state of the identification function values determined in advance for the respective road surface conditions; and a transmitter that transmits the determined road surface condition to the vehicle, wherein the determined road surface condition is displayed on a monitor within the vehicle to allow a driver to be informed of the determined road surface condition or is fed back to a vehicle control to safely control the vehicle.

6. A system for determining a road surface condition comprising:
- a plurality of vehicles, each vehicle including
  - on-board sensors for acquiring vehicular information, which is information on the behavior of a vehicle during travel,
  - a feature value calculator that calculates a plurality of feature values for estimating the condition of the road surface on which the vehicle is traveling from the vehicular information acquired by the on-board sensors, and
  - a transmitter that transmits the feature values to the outside of the vehicle; and
- a road surface condition management center including
  - a server for accumulating the feature values transmitted from the transmitter of each of the plurality of vehicles; and
  - a road surface condition determining unit for determining a road surface condition using the accumulated feature values of the plurality of vehicles;

wherein the transmitted feature values are the feature values for a location within a predetermined range within a predetermined space of time, and wherein the road surface condition determining unit determines the road surface condition at the location within the predetermined range within the predetermined space of time, using the feature values of the plurality of vehicles;

wherein the road surface condition determining unit comprises:
- a feature value similarity calculator that calculates the degrees of similarity of feature values, which are the degrees of similarity between the distribution state of the feature values and the distribution state of the feature values determined in advance for the respective road surface conditions;
- a road surface condition determiner that determines the road surface condition at the location within the predetermined range within the predetermined space of time from the calculated degrees of similarity of the feature values of the respective vehicles; and
- a transmitter that transmits the determined road surface condition to the vehicle, wherein the determined road surface condition is displayed on a monitor within the vehicle to allow a driver to be informed of the determined road surface condition or is fed back to a vehicle control to safely control the vehicle.

* * * * *